Jan. 8, 1963   A. S. VANDERHOOF   3,072,174
EXPANDING TOOL
Filed June 20, 1960   2 Sheets-Sheet 1

INVENTOR
ALTON S. VANDERHOOF
BY
Byerly, Townsend, Watson & Churchill
ATTORNEYS.

Jan. 8, 1963  A. S. VANDERHOOF  3,072,174
EXPANDING TOOL
Filed June 20, 1960  2 Sheets-Sheet 2
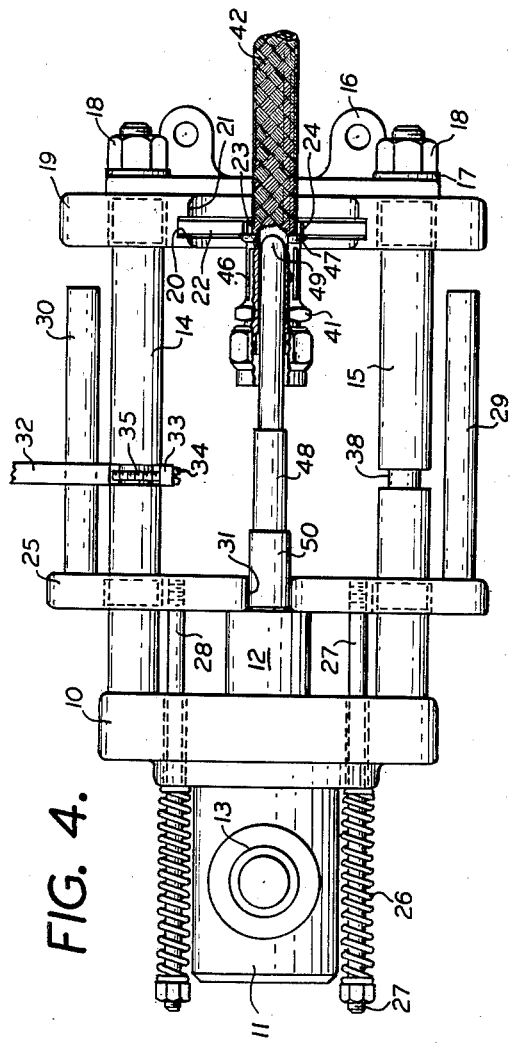
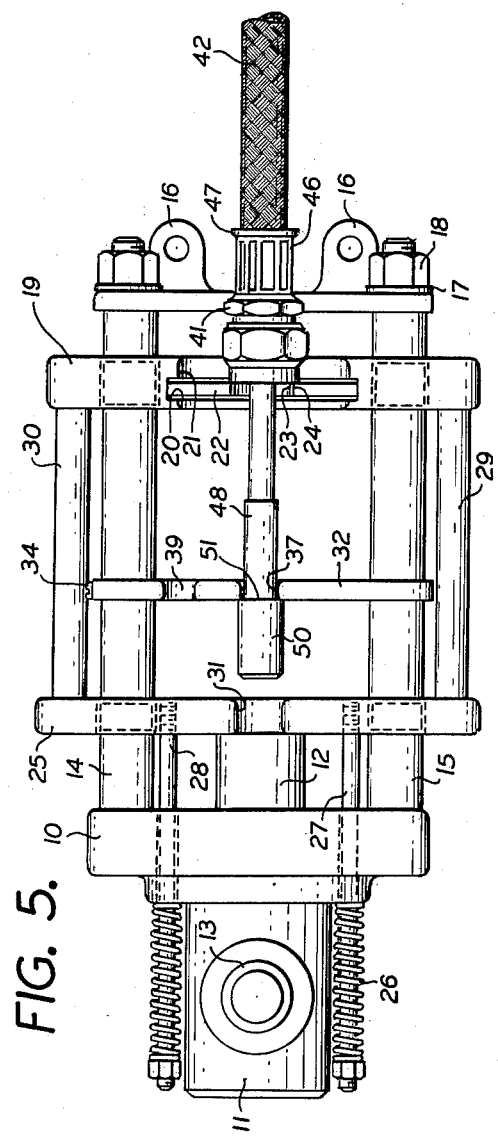
INVENTOR
ALTON S. VANDERHOOF
BY
Byerly, Townsend, Watson & Churchill
ATTORNEYS.

United States Patent Office 3,072,174
Patented Jan. 8, 1963

3,072,174
EXPANDING TOOL
Alton S. Vanderhoof, Caldwell, N.J., assignor to Resistoflex Corporation, Roseland, N.J., a corporation of New York
Filed June 20, 1960, Ser. No. 37,157
10 Claims. (Cl. 153—80.5)

The present invention relates to a tool for radially expanding the nipple of a hose end fitting during assembly of the fitting to a hose end where the fitting is of the type having at least a hose encircling socket in addition to the nipple.

Hose lines with end fittings which are assembled by compressing the end of the hose between a nipple and a socket are currently in widespread use on jet aircraft and missiles. Heretofore, assembly of the fittings to the lines, particularly in connection with lines made of reinforced polytetrafluoroethylene, was accomplished exclusively in the factory. However, for practical reasons there has been a considerable demand for tools enabling the assembly procedure to be carried out in the field. The problem has been to provide a light weight portable tool capable of performing the necessary operations on the fitting parts within close tolerances in order to yield uniformly satisfactory assemblies.

The present application is directed to a portable tool for expanding a fitting nipple within the end of a hose while such end is encircled by the fitting socket. Whether or not the socket has been previously swaged, expansion of the nipple must be accurately controlled in order that an optimum grip is obtained on the hose end. Over or under expansion can result in either leakage or blow-off of a fitting under operating conditions.

In general, the tool embodying the present invention is arranged to force a mandrel into the nipple of a hose fitting for a predetermined distance and then to extract the mandrel. This is accomplished by the use of a single action driven member or ram with the aid of a novel organization of force transmitting components and fitting engaging parts.

In accordance with the invention the tool is provided with a base, a driven member mounted for movement relative thereto, fitting engaging means for alternatively and selectably arresting movement of or imparting movement to the fitting in a given direction relative to the base, a mandrel, means for selectably securing the mandrel against movement in the given direction relative to the base, and means for alternatively and selectably imparting movement in the given direction from the driven member to the fitting engaging means or to the mandrel.

By the provision of interchangeable mandrels and fitting engaging elements a single tool is adapted to handle a wide range of hose and fitting sizes. Furthermore, in accordance with a further aspect of the invention, the fitting engaging means takes the form of a pressure plate of predetermined dimension arranged to have the added function of serving as a go-gage for swaged type sockets to supervise proper swaging thereof.

The invention will be better understood after reading the following detailed description of the presently preferred embodiment thereof with reference to the appended drawings in which:

FIG. 4 is a plan view of the tool of FIG. 1 in a mean operative position urging a mandrel into the nipple of a hose fitting; and FIG. 5 is a plan view similar to FIG. 4 but showing the mandrel partially extracted.

Figure 1:
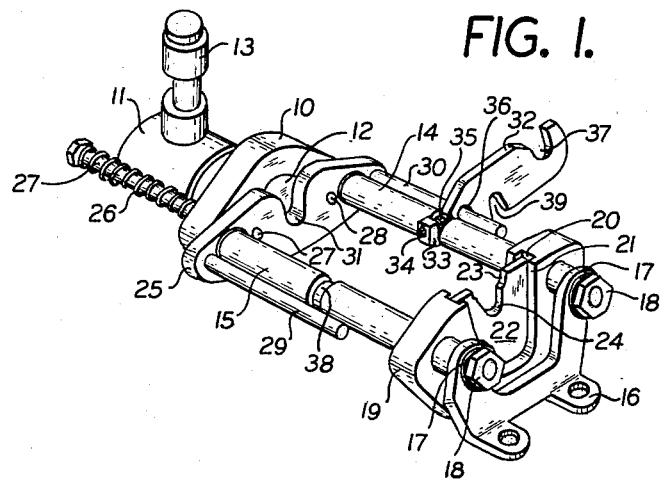
FIG. 1 is a perspective view of an expanding tool constructed in accordance with the present invention.

Referring now to FIG. 1 of the drawing, the expanding tool is provided with a base or mounting plate 10 carrying on one side a cylinder 11 housing an hydraulic ram 12 operable through a central opening in the base 10. An hydraulic coupling or fitting 13 is provided for coupling hydraulic fluid under pressure to the cylinder of the ram in order to actuate the latter. For field operation any suitable hand operated hydraulic pump may be coupled to the fitting 13 to actuate the ram.

Secured to opposite ends of the base 10 are two parallel guide rods 14 and 15. The guide rods carry at their outer ends a mounting plate 16 held in place by the lock washers and nuts 17 and 18, respectively. The mounting plate 16 acts as a stop for an adaptor or carrier member 19 which is mounted for guided movement along the guide rods 14 and 15. The carrier member 19 is provided with a U-shaped channel 20 in a similarly shaped opening 21 for receiving a series of interchangeable pressure plates such as the plate 22. A separate pressure plate is provided for each size fitting which is to be assembled by the tool. The size fitting to be handled determines the dimensions of the U-shaped slot 23 which extends inwardly from an edge of the pressure plate, as shown. The width of the slot, as determined by the diameter of the circular portion 24, should be greater than the outside diameter of the hose but less than the outside diameter of the rear of the fitting socket. This will be explained in further detail hereinafter.

An additional plate 25 is mounted upon the guide rods 14 and 15 for movement therealong between the base 10 and the carrier member 19. A pair of return springs, only one of which is shown at 26 in the drawing, are mounted upon retainer rods 27 and 28 which pass with a sliding fit through the base 10 and are secured to the plate 25. The plate 25 also carries a pair of shoulder pins or extension rods 29 and 30 which are positioned in the path of travel of the carrier member 19. A central slot 31 is provided in the plate 25 for locating the butt end of an expanding mandrel as better seen in FIGURES 4 and 5.

Still referring to FIG. 1, means for securing a mandrel against movement in the form of a stripper plate 32 is provided with a hooked end 33 secured by means of a screw 34 to the guide rod 14 for articulation in a groove or channel 35. As shown in the drawing, the plate 32 is in its inoperative position and is provided with a slot or cut-out 36 for accommodating the extension rod 30. A further cut-out or slot 37 is provided at the opposite end of the plate 32 for engaging the groove 38 in the guide rod 15. A U-shaped slot 39 is provided at the center of the plate 32 for accommodating a portion of a mandrel as more clearly illustrated in FIG. 5.

Before proceeding to a discussion of the operation of the expanding tool, it will be helpful to consider the type of fitting upon which the tool is intended to be used. Reference for this purpose should be had to FIG. 2 which shows the components of a standard swaged type fitting for use on braid reinforced polytetrafluoroethylene hose. The fitting consists of a nipple 40 having a ribbed or grooved body for insertion within the hose and a socket 41 for encircling the hose, the latter being shown as having a steel braid jacket 42 upon a polytetrafluoroethylene liner 43. In known manner the nipple 40 is provided with threads 44 for engaging complementary threads on the socket 41. This is illustrated in FIG. 3 to which attention is now directed.

Figure 2:
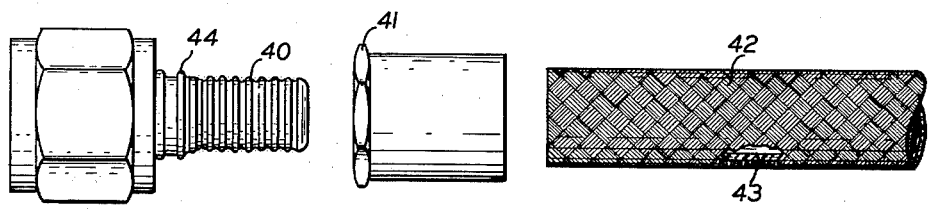
FIG. 2 is an exploded view of the component parts of a currently standard fitting which can be assembled by means of the tool of FIG. 1.

The fitting components shown in FIG. 2 are intended to be assembled to a hose by first swaging the socket 41 upon the exterior of the hose by means of radial dies followed by expansion of the nipple 40 within the hose liner. This particular method of assembly is described in further detail in Patent No. 2,865,094 issued to Irving D. Press on December 23, 1958 and assigned to the same assignee as the present invention. Thus, in FIG. 3 of the present application the socket is shown already swaged in place.

According to one aspect of the present invention the pressure plate 22 is dimensioned to function as a go-gage for determining whether or not the swaging operation upon the socket has been satisfactorily completed. If the socket has been swaged sufficiently, the intermediate portion portion thereof, 46, will pass smoothly into the portion 24 of the slot 23 in the pressure plate 22.

Figure 3:
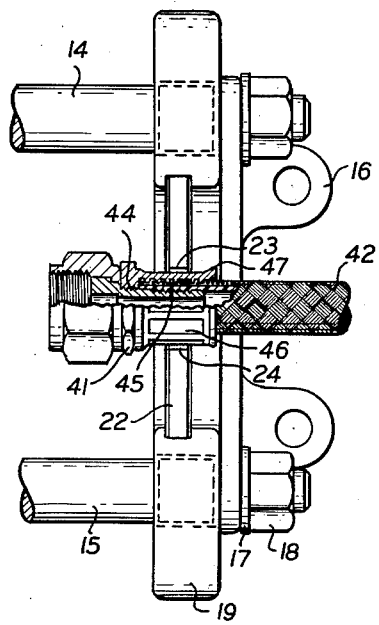
FIG. 3 is a partial plan view partly in section of the fitting of FIG. 2 partially assembled to the hose through the swaging of its socket and showing the socket in place in the go-gage pressure plate.

By comparing FIG. 3 with FIG. 2 it will be seen that the swaging operation upon the socket causes the intermediate portion 46 to have a smaller diameter than the mouth or rear 47. Thus, with the fitting and hose installed in the slot 23 in the pressure plate 22 as shown in FIG. 4, the portion 24 will accommodate the body of the hose without permitting the socket to pass axially therethrough.

As shown in FIG. 4, the carrier member 19 is at the limit of its travel engaging the mounting plate 16. In this position the plate 25 is free to move for a fixed distance before the extension rods 29 and 30 will engage the carrier member 19, limiting further movement.

Prior to actuation of the ram 12 a suitable size mandrel 48 has its nose 49 inserted into the open end of the fitting nipple with its butt 50 resting in the locating slot 31 in the plate 25 against the face of the ram 12. FIG. 4 shows the ram extended part-way, having urged both the mandrel 48 and the plate 25 away from the base 10. Power is applied to the ram to advance the mandrel until the nose of the mandrel has passed through the nipple. When a hand-operated pump is employed this will be determined by the sensing of a slight release of pressure. At this point, the hydraulic pressure may be released so that the return springs retract the ram and plate 25 leaving the mandrel 48 inserted within the hose fitting.

With the mandrel fully inserted in the fitting, the fitting is moved from one side of the pressure plate 22 to the opposite side as shown in FIG. 5. The plate 22 now engages the open end of the fitting. However, before installing the fitting behind the pressure plate 22, the stripper plate 32 is swung into position in the path of the ram 12 straddling the guide rods 14 and 15. Now with the carrier member 19 withdrawn from the mounting plate 16 the mandrel can be inserted with its shoulder 51 disposed behind the slot 39 in the plate 32. The slot 39 is made large enough to accommodate the central portion of the mandrel while engaging the shoulder 51. At the same time, the butt end 50 of the mandrel will be spaced from the face of the ram 12. Thus, the ram 12 can urge the plate 25 carrying the extension rods 29 and 30 along the guide rods 14 and 15 without engaging the butt of the mandrel.

As shown in FIG. 5, the extension rods bear against the carrier member 19 urging the latter in a direction away from the stripper plate 32. Since the stripper plate engages the shoulder 51 on the mandrel it locks the mandrel against movement in the same direction causing it to be extracted from the fitting. As shown in FIG. 5, the operation is only partially completed.

There has thus been provided a very simple and easy to operate tool for expanding a nipple of a hose end fitting. By providing a series of mandrels having noses of different diameters along with a complementary set of pressure plates having different size openings therein, the expanding tool can be used for assembling a large range of fittings.

Having described the invention with reference to a preferred embodiment thereof, it will be apparent to those skilled in the art that numerous changes may be made therein without departing from the true spirit of the invention as defined in the appended claims.

What is claimed is:

1. A tool for radially expanding the nipple of a hose end fitting during assembly of the fitting to a hose end, the fitting being of the type having at least a hose encircling socket in addition to the nipple, said tool comprising a base, a ram movable relative to said base, a pressure plate for engaging selectably the rear of said socket or the open end of said fitting and having an opening therethrough for accommodating the body of the hose without permitting said socket to pass axially therethrough, means for supporting said pressure plate in the path of said ram for limited movement relative to said base in the direction of travel of said ram, a mandrel, means for selectably securing said mandrel in fixed position relative to said base, and means for alternatively and selectably imparting movement from said ram to said pressure plate or to said mandrel.

2. A tool for radially expanding the nipple of a hose fitting during assembly of the fitting to a hose end, the fitting being of the type having at least a hose encircling socket in addition to the nipple, said tool comprising a base, a driven member mounted for movement relative to said base, fitting engaging means for alternatively and selectably arresting movement of or imparting movement to said fitting in a given direction relative to said base, a mandrel, means for selectably securing said mandrel against movement in said given direction relative to said base, and means for alternatively and selectably imparting movement in said given direction from said driven member to said fitting engaging means or to said mandrel.

3. A tool according to claim 2, wherein the fitting engaging means comprise a carrier member mounted for movement relative to said base, and a pressure plate removably mounted in said carrier member, said pressure plate having an opening therethrough of a size to accommodate the body of the hose without permitting the socket to pass axially therethrough.

4. A tool according to claim 3, wherein the opening in the pressure plate consists of a generally U-shaped slot extending inwardly from an edge of said plate, the width of said slot being greater than the outside diameter of the hose but less than the outside diameter of the open end of said socket.

5. A tool according to claim 4, wherein the width of said slot is accurately dimensioned equal to a desired maximum outside diameter of an intermediate portion of said socket after swaging upon the hose.

6. A tool for radially expanding the nipple of a hose end fitting during assembly of the fitting to a hose end, the fitting being of the type have at least a hose encircling socket in addition to the nipple, said tool comprising a base, a ram movable relative to said base, a pair of parallel guide rods extending from said base on opposite sides of said ram in the direction of movement thereof, a pressure plate for engaging selectably the rear of said socket or the open end of said fitting and having an opening therethrough for accommodating the body of the hose without permitting said socket to pass axially therethrough, means for mounting said pressure plate on said guide rods for movement therealong, means at the ends of said guide rods remote from said base for arresting movement of said pressure plate mounting means away from said base, a mandrel, means for selectably securing said mandrel in fixed position relative to said base, and means for alternatively and selectably imparting movement from said ram to said pressure plate mounting means or to said mandrel.

7. A tool according to claim 6, wherein said mandrel includes a nose for entering the nipple and a shoulder intermediate its length facing in the direction of said nose, and said means for selectably securing said mandrel comprises a stripper plate having means for securing it to said guide rods intermediate the ends thereof and an opening for accommodating the body of said mandrel on the nose side of said shoulder, the size of said opening being such that said stripper plate engages said shoulder.

8. A tool according to claim 7, wherein said stripper plate is swingably mounted in a groove in one of said guide rods for articulation between a position straddling said guide rods in the path of travel of said mandrel and a position out of said path.

9. A tool according to claim 8, wherein the opening in said plate is in the form of a U-shaped slot extending inwardly from an edge of said stripper plate.

10. A tool according to claim 6, wherein the means for imparting movement to the pressure plate comprise an additional plate mounted on said guide rods for movement therealong in the path of said ram between the latter and the pressure plate mounting means, and a pair of extension rods mounted on said additional plate for engaging said mounting means, said extension rods being shorter than said guide rods for permitting said additional plate to move optionally without imparting movement to said mounting means.

References Cited in the file of this patent

UNITED STATES PATENTS

| 2,060,860 | Flynt | Nov. 17, 1936 |

FOREIGN PATENTS

| 875,644 | France | June 29, 1942 |
| 852,534 | Germany | Oct. 16, 1952 |